United States Patent
Rihn

(10) Patent No.: US 10,572,019 B2
(45) Date of Patent: Feb. 25, 2020

(54) HAPTIC TRIGGER MODIFICATION SYSTEM

(71) Applicant: Immersion Corporation, San Jose, CA (US)

(72) Inventor: William Rihn, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 16/203,841

(22) Filed: Nov. 29, 2018

(65) Prior Publication Data

US 2019/0113978 A1 Apr. 18, 2019

Related U.S. Application Data

(63) Continuation of application No. 14/538,955, filed on Nov. 12, 2014, now Pat. No. 10,185,396.

(51) Int. Cl.
*H04B 3/36* (2006.01)
*G06F 3/01* (2006.01)
(Continued)

(52) U.S. Cl.
CPC ............ *G06F 3/016* (2013.01); *A63F 13/22* (2014.09); *A63F 13/24* (2014.09); *A63F 13/28* (2014.09)

(58) Field of Classification Search
CPC ............ G06F 3/016; G06F 2203/013; G06F 2203/014; G06F 2203/015; A63F 13/22;
(Continued)

(56) References Cited

U.S. PATENT DOCUMENTS 5,473,126 A 12/1995 Wu
5,959,613 A 9/1999 Rosenberg et al.
(Continued)

FOREIGN PATENT DOCUMENTS

CN 1983125 A 6/2007
CN 102822772 A 12/2012
(Continued)

OTHER PUBLICATIONS

Conan Hughes, "Turn Off Wii Remote's Rumble Feature", Apr. 9, 2011, XP055172295, http://www.conanhughes.com/2011/04/turn-off-wii-remotes-rumble-feature.ht-ml.
(Continued)

*Primary Examiner* — Naomi J Small
(74) *Attorney, Agent, or Firm* — Medler Ferro Woodhouse & Mills PLLC

(57) ABSTRACT

A system is provided that modifies a haptic effect experienced at a user input element. The system sends a haptic instruction and a haptic effect definition to a peripheral device. The system further receives user input data including a position of the user input element, or a force applied to the user input element. The system further modifies the haptic effect definition based on the received user input data. The system further sends a new haptic instruction and the modified haptic effect definition to the peripheral device. The system further causes a haptic output device to modify a haptic effect based on the modified haptic effect definition at the user input element of the peripheral device in response to the new haptic instruction.

20 Claims, 9 Drawing Sheets

(51) Int. Cl.
*A63F 13/24* (2014.01)
*A63F 13/22* (2014.01)
*A63F 13/28* (2014.01)

(58) Field of Classification Search
CPC ........ A63F 13/24; A63F 13/28; A63F 13/285;
A63F 13/92; A63F 2300/1037
USPC ...................................................... 340/407.1
See application file for complete search history.

(56) References Cited

U.S. PATENT DOCUMENTS

| | | | |
|---|---|---|---|
| 6,005,551 A * | 12/1999 | Osborne | G06F 3/016 345/161 |
| 6,169,540 B1 | 1/2001 | Rosenberg et al. | |
| 6,184,868 B1 | 2/2001 | Shahoian et al. | |
| 6,343,349 B1 | 1/2002 | Braun et al. | |
| 6,424,356 B2 | 7/2002 | Chang et al. | |
| 6,468,158 B1 | 10/2002 | Ootori et al. | |
| 6,563,487 B2 | 5/2003 | Martin et al. | |
| 6,710,764 B1 | 3/2004 | Burgel et al. | |
| 7,182,691 B1 | 2/2007 | Schena | |
| 7,194,287 B2 * | 3/2007 | Usuki | H04R 11/06 340/388.4 |
| 7,196,688 B2 | 3/2007 | Schena | |
| 7,336,260 B2 | 2/2008 | Martin et al. | |
| 7,791,588 B2 | 9/2010 | Tierling et al. | |
| 7,808,488 B2 | 10/2010 | Martin et al. | |
| 7,965,276 B1 * | 6/2011 | Martin | G06F 3/016 345/156 |
| 7,979,146 B2 | 7/2011 | Ullrich et al. | |
| 7,979,797 B2 | 7/2011 | Schena | |
| 8,000,825 B2 | 8/2011 | Ullrich et al. | |
| 8,159,461 B2 | 4/2012 | Martin et al. | |
| 8,164,573 B2 | 4/2012 | Da Costa et al. | |
| 8,168,599 B2 | 5/2012 | Petito et al. | |
| 8,210,942 B2 | 7/2012 | Shimabukuro et al. | |
| 8,378,964 B2 | 2/2013 | Ullrich et al. | |
| 8,384,316 B2 | 2/2013 | Houston et al. | |
| 8,419,541 B2 | 4/2013 | Mao | |
| 8,723,820 B1 | 5/2014 | Han | |
| 8,754,757 B1 | 6/2014 | Ullrich et al. | |
| 8,754,758 B1 | 6/2014 | Ullrich et al. | |
| 9,164,587 B2 | 10/2015 | Da Costa et al. | |
| 9,171,437 B2 | 10/2015 | Nakamura et al. | |
| 9,174,134 B1 | 11/2015 | Grant et al. | |
| 9,367,136 B2 | 6/2016 | Latta et al. | |
| 9,370,459 B2 | 6/2016 | Mahoney | |
| 9,370,704 B2 | 6/2016 | Marty | |
| 9,392,094 B2 | 7/2016 | Hunt et al. | |
| 9,462,262 B1 | 10/2016 | Worley, III et al. | |
| 9,514,620 B2 | 12/2016 | Bhatia | |
| 9,519,346 B2 | 12/2016 | Lacroix et al. | |
| 9,557,830 B2 | 1/2017 | Grant | |
| 9,619,029 B2 | 4/2017 | Lacroix et al. | |
| 9,626,805 B2 | 4/2017 | Lampotang et al. | |
| 9,645,646 B2 | 5/2017 | Cowley et al. | |
| 9,652,037 B2 | 5/2017 | Rubin et al. | |
| 9,753,542 B2 | 9/2017 | Chizeck et al. | |
| 9,760,166 B2 | 9/2017 | Ammi et al. | |
| 9,811,854 B2 | 11/2017 | Lucido | |
| 9,814,974 B2 | 11/2017 | Grant et al. | |
| 9,849,379 B2 | 12/2017 | Alghooneh et al. | |
| 9,851,799 B2 | 12/2017 | Keller et al. | |
| 9,852,590 B2 | 12/2017 | Bhatia | |
| 9,933,851 B2 | 4/2018 | Goslin et al. | |
| 9,948,885 B2 | 4/2018 | Kurzweil | |
| 10,185,396 B2 | 1/2019 | Rihn | |
| 10,226,697 B2 | 3/2019 | Schmitz et al. | |
| 10,254,838 B2 | 4/2019 | Venkatesan et al. | |
| 2002/0024503 A1 | 2/2002 | Armstrong | |
| 2002/0080112 A1 | 6/2002 | Braun et al. | |
| 2003/0030619 A1 | 2/2003 | Martin et al. | |
| 2004/0056840 A1 | 3/2004 | Goldenberg et al. | |
| 2005/0134561 A1 * | 6/2005 | Tierling | G06F 3/016 345/156 |
| 2005/0151720 A1 * | 7/2005 | Cruz-Hernandez | G06F 3/016 345/156 |
| 2006/0109256 A1 * | 5/2006 | Grant | G06F 3/016 345/173 |
| 2006/0290662 A1 | 12/2006 | Houston et al. | |
| 2007/0013677 A1 | 1/2007 | Rosenberg et al. | |
| 2007/0182708 A1 | 8/2007 | Poupyrev et al. | |
| 2007/0265077 A1 | 11/2007 | Tom et al. | |
| 2007/0290988 A1 | 12/2007 | Nogami et al. | |
| 2008/0223627 A1 | 9/2008 | Lacroix et al. | |
| 2008/0294984 A1 | 11/2008 | Ramsay et al. | |
| 2009/0033624 A1 | 2/2009 | Rosenberg et al. | |
| 2009/0088659 A1 * | 4/2009 | Graham | G06F 3/015 600/545 |
| 2009/0122006 A1 | 5/2009 | Nielsen et al. | |
| 2009/0297328 A1 | 12/2009 | Slocum, III | |
| 2010/0122006 A1 | 5/2010 | Kanaya | |
| 2010/0148943 A1 | 6/2010 | Rosenberg et al. | |
| 2010/0151948 A1 | 6/2010 | Vance et al. | |
| 2010/0173686 A1 * | 7/2010 | Grant | A63F 13/06 463/2 |
| 2010/0231541 A1 * | 9/2010 | Cruz-Hernandez | G06F 3/016 345/173 |
| 2011/0006888 A1 | 1/2011 | Bae et al. | |
| 2011/0018697 A1 | 1/2011 | Birnbaum | |
| 2011/0163860 A1 | 7/2011 | Ryu et al. | |
| 2011/0202155 A1 | 8/2011 | Ullrich et al. | |
| 2011/0215913 A1 | 9/2011 | Ullrich et al. | |
| 2011/0244963 A1 | 10/2011 | Grant et al. | |
| 2011/0264491 A1 | 10/2011 | Birnbaum et al. | |
| 2012/0068970 A1 | 3/2012 | Pemberton-Pigott | |
| 2012/0206246 A1 | 8/2012 | Cruz-Hernandez et al. | |
| 2012/0206247 A1 | 8/2012 | Bhatia et al. | |
| 2012/0306631 A1 | 12/2012 | Hughes | |
| 2013/0131851 A1 | 5/2013 | Ullrich et al. | |
| 2013/0147610 A1 | 6/2013 | Grant et al. | |
| 2013/0194085 A1 | 8/2013 | Grant et al. | |
| 2013/0207792 A1 | 8/2013 | Lim et al. | |
| 2013/0207917 A1 | 8/2013 | Cruz-Hernandez et al. | |
| 2013/0222311 A1 | 8/2013 | Pesonen | |
| 2013/0265286 A1 | 10/2013 | Da Costa et al. | |
| 2013/0267321 A1 | 10/2013 | Burgess et al. | |
| 2013/0324254 A1 * | 12/2013 | Huang | G06F 3/016 463/37 |
| 2013/0335209 A1 | 12/2013 | Cruz-Hernandez et al. | |
| 2014/0002386 A1 | 1/2014 | Rosenberg et al. | |
| 2014/0064516 A1 | 3/2014 | Cruz-Hernandez et al. | |
| 2014/0118125 A1 | 5/2014 | Bhatia | |
| 2014/0315642 A1 | 10/2014 | Grant et al. | |
| 2014/0366635 A1 * | 12/2014 | Zusman | G01H 1/00 73/658 |
| 2015/0070146 A1 | 3/2015 | Cruz-Hernandez et al. | |
| 2015/0070147 A1 | 3/2015 | Cruz-Hernandez et al. | |
| 2015/0070148 A1 | 3/2015 | Cruz-Hernandez et al. | |
| 2015/0070260 A1 | 3/2015 | Saboune et al. | |
| 2015/0070261 A1 | 3/2015 | Saboune et al. | |
| 2015/0070265 A1 | 3/2015 | Cruz-Hernandez et al. | |
| 2015/0130706 A1 | 5/2015 | Lacroix et al. | |
| 2015/0130707 A1 | 5/2015 | Da Costa et al. | |
| 2015/0352437 A1 | 12/2015 | Koseki et al. | |
| 2016/0070348 A1 | 3/2016 | Cowley et al. | |
| 2016/0084605 A1 | 3/2016 | Monti | |
| 2016/0086457 A1 | 3/2016 | Baron et al. | |
| 2016/0132114 A1 | 5/2016 | Rihn et al. | |
| 2016/0132116 A1 | 5/2016 | Grant et al. | |
| 2016/0163227 A1 | 6/2016 | Penake et al. | |
| 2016/0166930 A1 | 6/2016 | Brav et al. | |
| 2016/0169635 A1 | 6/2016 | Hannigan et al. | |
| 2016/0170508 A1 | 6/2016 | Moore et al. | |
| 2016/0171860 A1 | 6/2016 | Hannigan et al. | |
| 2016/0171908 A1 | 6/2016 | Moore et al. | |
| 2016/0175703 A1 | 6/2016 | Venkatesan et al. | |
| 2016/0179220 A1 | 6/2016 | Venkatesan et al. | |
| 2016/0187969 A1 | 6/2016 | Larsen et al. | |
| 2016/0187974 A1 | 6/2016 | Mallinson | |
| 2016/0201888 A1 | 7/2016 | Ackley et al. | |

(56) References Cited

U.S. PATENT DOCUMENTS

| | | |
|---|---|---|
| 2016/0209658 A1 | 7/2016 | Zalewski |
| 2016/0214015 A1 | 7/2016 | Osman et al. |
| 2016/0214016 A1 | 7/2016 | Stafford |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203207 A1 | 7/2017 | Lacroix et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0212591 A1 | 7/2017 | Churikov et al. |
| 2017/0214782 A1 | 7/2017 | Brinda |
| 2017/0257270 A1 | 9/2017 | Goslin et al. |
| 2017/0333788 A1 | 11/2017 | Grant et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0074589 A1 | 3/2018 | Da Costa et al. |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |
| 2018/0188812 A1 | 7/2018 | Grant et al. |

FOREIGN PATENT DOCUMENTS

| | | |
|---|---|---|
| CN | 102906667 A | 1/2013 |
| CN | 103282089 A | 9/2013 |
| CN | 103365415 A | 10/2013 |
| CN | 104043245 A | 9/2014 |
| CN | 104107539 A | 10/2014 |
| EP | 0864144 A2 | 9/1998 |
| EP | 0875819 A1 | 11/1998 |
| EP | 2039404 A2 | 3/2009 |
| EP | 2648071 A1 | 10/2013 |
| EP | 2796965 A2 | 10/2014 |
| JP | 2001137553 A | 5/2001 |
| JP | 2003534620 A | 11/2003 |
| JP | 2005056267 A | 3/2005 |
| JP | 2008173186 A | 7/2008 |
| JP | 2009233108 A | 10/2009 |
| JP | 2009535694 A | 10/2009 |
| JP | 2010165383 A | 7/2010 |
| JP | 2013524351 A | 6/2013 |
| JP | 2013164845 A | 8/2013 |
| JP | 2014180572 A | 9/2014 |
| KR | 20130040853 A | 4/2013 |
| WO | 2003032289 A1 | 4/2003 |
| WO | 2010065207 A1 | 6/2010 |

OTHER PUBLICATIONS

Mkwone, "Move FAQ—Playstation Forum", Sep. 3, 2010, XP055172297, http://community.eu.playstation.com/t5/PlayStation-Move/Move-Faq/td-p/114- 47251.

Any information that are not included with this Information Disclosure Statement can be found in U.S. Appl. No. 14/538,955.

The Extended European Search Report issued in European Application No. 19189590.3, dated Nov. Nov. 18, 2019.

Notification of the First Office Action issued in Chinese Application No. 201410640185.2, dated Dec. 25, 2019.

* cited by examiner

HAPTIC TRIGGER MODIFICATION SYSTEM

PRIORITY APPLICATION

This application is a continuation of U.S. patent application Ser. No. 14/538,955, filed on Nov. 12, 2014, the specification of which is hereby incorporated by reference in its entirety.

FIELD

One embodiment is directed generally to a device, and more particularly, to a device that produces haptic effects.

BACKGROUND

Video games and video game systems have become extremely popular. Video game devices or controllers typically use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects." Haptic feedback can provide cues that enhance and simplify a user's interaction with a video game controller, or other electronic device. Specifically, vibration effects, or vibrotactile haptic effects, may be useful in providing cues to users of video game controllers or other electronic devices to alert the user to specific events, or provide realistic feedback to create greater sensory immersion within a simulated or virtual environment.

Other devices, such as medical devices, automotive controls, remote controls, and other similar devices where a user interacts with a user input element to cause an action, also benefit from haptic feedback or haptic effects. For example, and not by way of limitation, user input elements on medical devices may be operated by a user outside the body of a patient at a proximal portion of a medical device to cause an action within the patient's body at a distal end of the medical device. Haptic feedback or haptic effects may be employed to alert the user to specific events, or provide realistic feedback to the user regarding an interaction of the medical device with the patient at the distal end of the medical device.

SUMMARY

One embodiment is a system that modifies a haptic effect experienced at a user input element. The system sends a haptic instruction and a haptic effect definition to a peripheral device. The system further receives user input data including a position of the user input element, or a force applied to the user input element. The system further modifies the haptic effect definition based on the received user input data. The system further sends a new haptic instruction and the modified haptic effect definition to the peripheral device. The system further causes a haptic output device to modify a haptic effect based on the modified haptic effect definition at the user input element of the peripheral device in response to the new haptic instruction.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
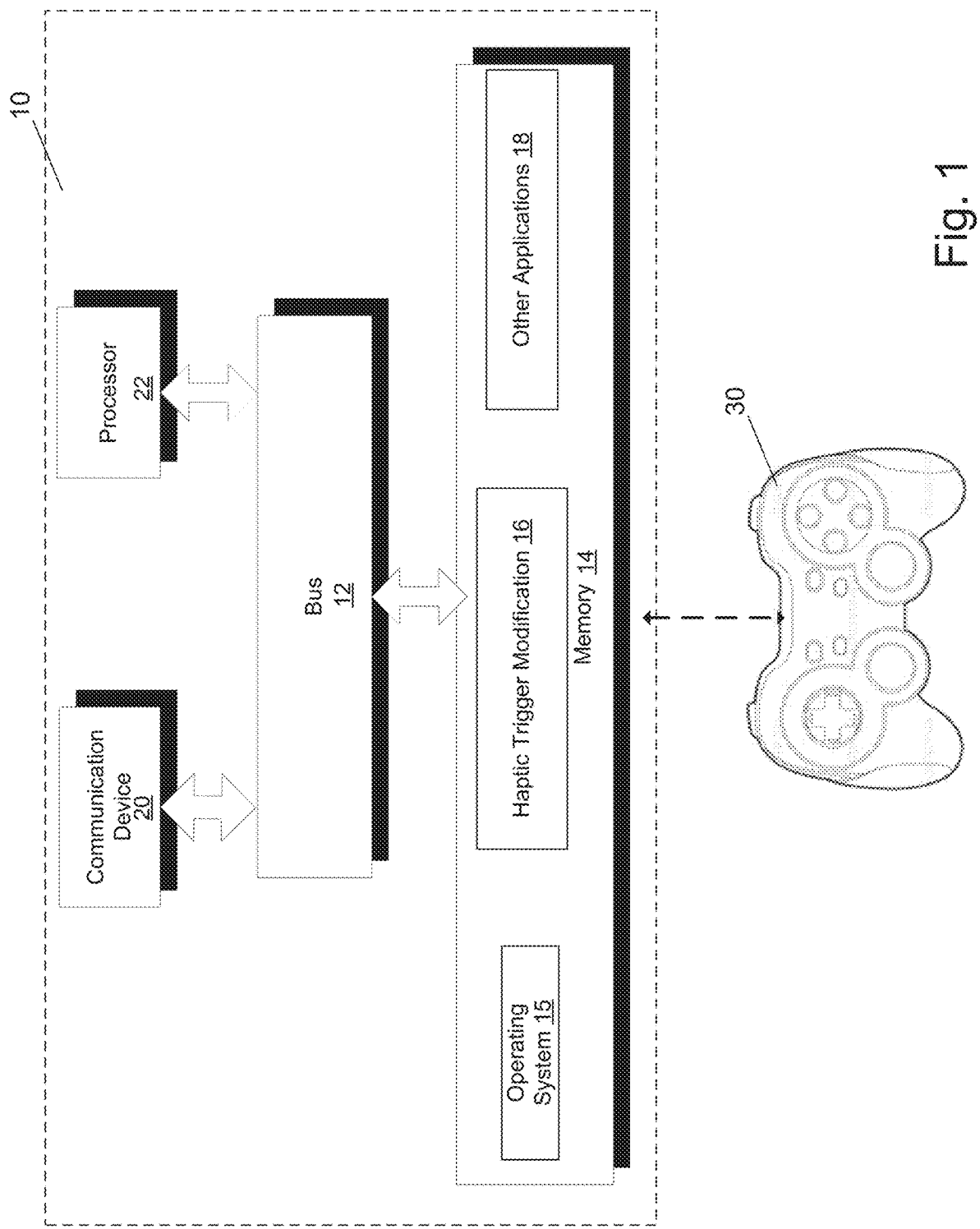
FIG. 1 illustrates a block diagram of a system in accordance with one embodiment of the invention.

One embodiment is a system that modifies haptic feedback that is experienced at a peripheral device, such as a game controller or gamepad, based on user input data received from the peripheral device. For example, the system can modify a trigger haptic effect that is experienced at a trigger of a controller, or some other peripheral device, based on trigger data received from the peripheral device. Examples of trigger data can include a position of a trigger, a closure rate of the trigger, or a force applied to the trigger. Examples of modifications of the trigger haptic effect can include programmatically modifying a magnitude (i.e., strength), frequency, attack, decay, or duration of the trigger haptic effect. By modifying a trigger haptic effect, a system can compensate for a trigger position, trigger closure rate, or force applied to the trigger so that an "ideal" trigger haptic effect is experienced at the trigger. As another example, the system can modify a general haptic effect that is experienced at a user input element of the controller, gamepad, or other peripheral device, based on user input data. The modified haptic feedback sensation can compensate for a user's interaction with the user input element.

The system can first receive a haptic effect definition. The system can further receive trigger data, such as a position of a trigger, a closure rate of the trigger, or a force applied to the trigger. Examples of such trigger data can include placing the trigger in a specific position, sweeping the trigger through a specific position, or squeezing the trigger. The system can programmatically modify the haptic effect definition based on the received trigger data, such as programmatically modifying a magnitude parameter, a frequency parameter, a directionality parameter, an attack parameter, a decay parameter, and/or a duration parameter of the haptic effect definition. The system can then cause one or more motors or actuators of the controller, gamepad, or other peripheral device, to play, or otherwise output, haptic feedback based on the modified haptic effect definition, thus causing modified haptic feedback to be experienced. In other words, the system can cause the controller, gamepad, or other peripheral device, to playback a haptic effect based on the modified haptic effect definition, where the haptic feedback based on the modified haptic effect definition can be different from the haptic feedback based on the original haptic effect definition. As understood by one of ordinary skill in the relevant art, "playback" is the act or instance of reproducing data (e.g., audio data, video data, or haptic data). Thus, in one example, the system can modify an overall trigger haptic effect to be experienced at a trigger of the controller based on a user's interaction with the trigger.

In one example embodiment, a weapon within a gaming application can have a reload effect that creates a trigger haptic effect of "buzzing" at a trigger of a controller, creating a haptic sensation as if there was an actuator within the trigger itself. A trigger haptic effect of this nature may require that only a very small amount of force be applied to the trigger. However, in the heat of gameplay combat, a user may cause his or her finger to continuously pull the trigger, thus negating the trigger haptic effect. According to the embodiment, the system can determine a position of the trigger (or a closure rate of the trigger, or a force applied to the trigger) and can modify the trigger haptic effect so that the trigger haptic effect can still be experienced.

FIG. 1 illustrates a block diagram of a system 10 in accordance with one embodiment of the invention. In one embodiment, system 10 is part of a device (e.g., a personal computer or console, such as a video game console), and system 10 provides a trigger haptic effect modification functionality for the device. In another embodiment, system 10 is separate from the device (e.g., personal computer or console), and remotely provides the aforementioned functionality for the device. Although shown as a single system, the functionality of system 10 can be implemented as a distributed system. System 10 includes a bus 12 or other communication mechanism for communicating information, and a processor 22 operably coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of an overall device in one embodiment. The modules further include a haptic trigger modification module 16 that modifies a haptic effect experienced at a trigger. In certain embodiments, haptic trigger modification module 16 can comprise a plurality of modules, where each module provides specific individual functionality for modifying a haptic effect experienced at a trigger. System 10 will typically include one or more additional application modules 18 to include additional functionality, such as peripheral firmware which can provide control functionality for a peripheral device, such as a controller 30.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

System 10 is operably connected to controller 30. Controller 30 is a peripheral device used to provide input to system 10. Controller 30 can be operably connected to system 10 using either a wireless connection or a wired connection. Controller 30 can further include a local processor which can communicate with system 10 using either a wireless connection or a wired connection. Alternatively, controller 30 may be configured to not include a local processor, and all input signals and/or output signals associated with controller 30 can be handled and processed directly by processor 22 of system 10.

Controller 30 can further include one or more digital buttons, one or more analog buttons, one or more bumpers, one or more directional pads, one or more analog or digital sticks, one or more driving wheels, and/or one or more user input elements that can be interacted with by a user, and that can provide input to system 10. Controller 30 can also include one or more analog or digital trigger buttons (or "triggers") that can further be interacted with by the user, and that can further provide input to system 10. As is described below in greater detail, controller 30 can further include a motor, or another type of actuator or haptic output device, configured to exert a bi-directional push/pull force on at least one trigger of controller 30.

Controller 30 can also include one or more actuators, or other types of haptic output devices. The local processor of controller 30, or, processor 22 in embodiments where controller 30 does not include a local processor, may transmit a haptic signal associated with a haptic effect to at least one actuator of controller 30. The actuator, in turn, outputs haptic effects such as vibrotactile haptic effects, kinesthetic haptic effects, or deformation haptic effects, in response to the haptic signal. The haptic effects can be experienced at a user input element (e.g., a digital button, analog button, bumper, directional pad, analog or digital stick, driving wheel, slider, or trigger) of controller 30. Alternatively, the haptic effects can be experienced at an outer surface of controller 30. The actuator includes an actuator drive circuit. The actuator may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. An actuator is an example of a haptic output device, where a haptic output device is a device configured to output haptic effects, such as vibrotactile haptic effects, electrostatic friction haptic effects, or deformation haptic effects, in response to a drive signal. In alternate embodiments, the one or more actuators within controller 30 can be replaced by some other type of haptic output device.

Controller 30 can further include one or more speakers. The local processor of controller 30, or, processor 22 in embodiments where controller 30 does not include a local processor, may transmit an audio signal to at least one speaker of controller 30, which in turn outputs audio effects. The speaker may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

Controller 30 can further include one or more sensors. A sensor can be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. The sensor can further be configured to convert the detected energy, or other physical property, into an electrical signal, or any signal that represents virtual sensor information, and controller 30 can send the converted signal to the local processor of controller 30, or, processor 22 in embodiments where controller 30 does not include a local processor. The sensor can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense $CPS^2$ 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, camera, or a light-dependent resistor.

Figure 2:
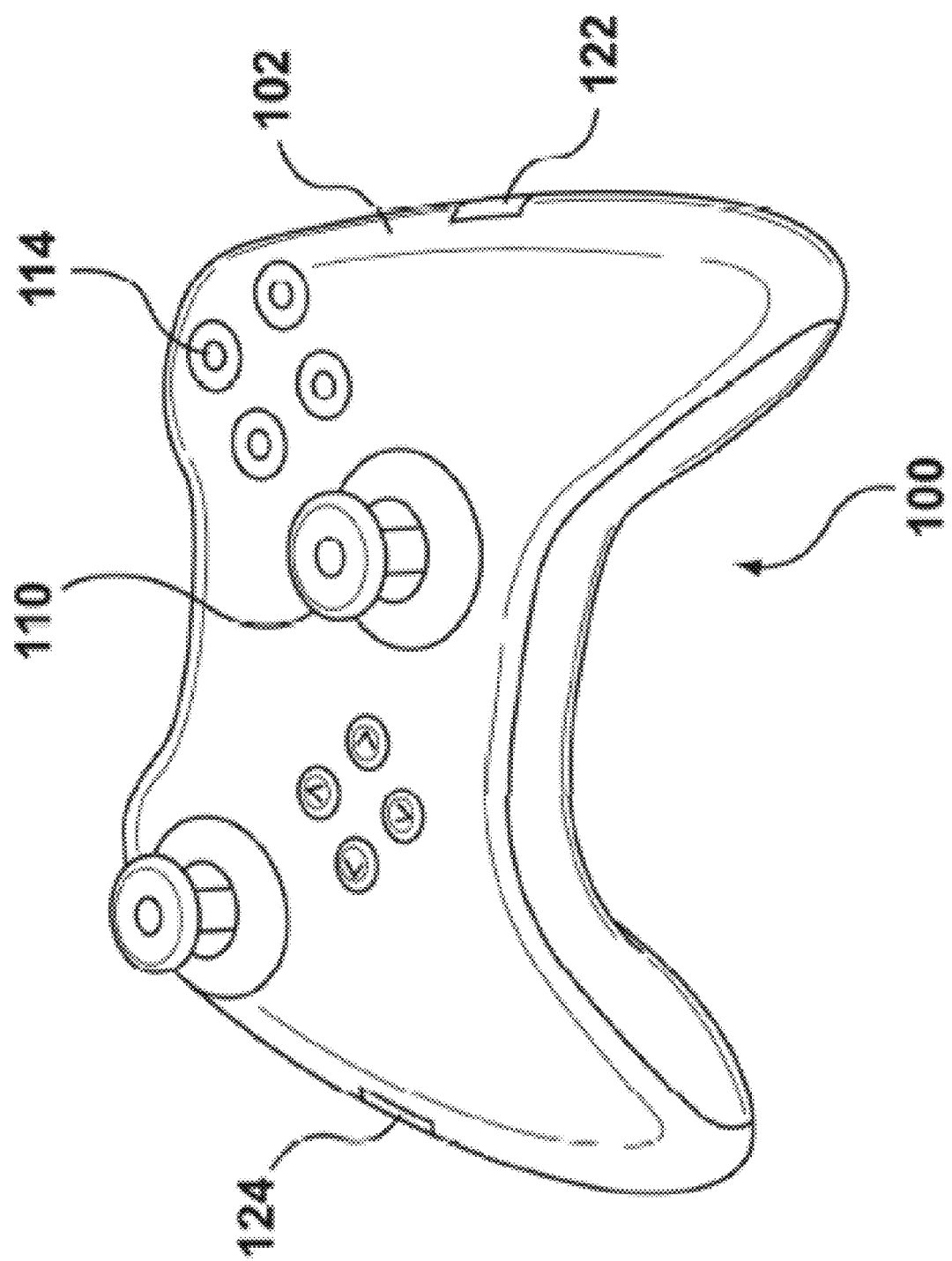
FIG. 2 illustrates a controller, according to an embodiment of the invention.
Figure 3:
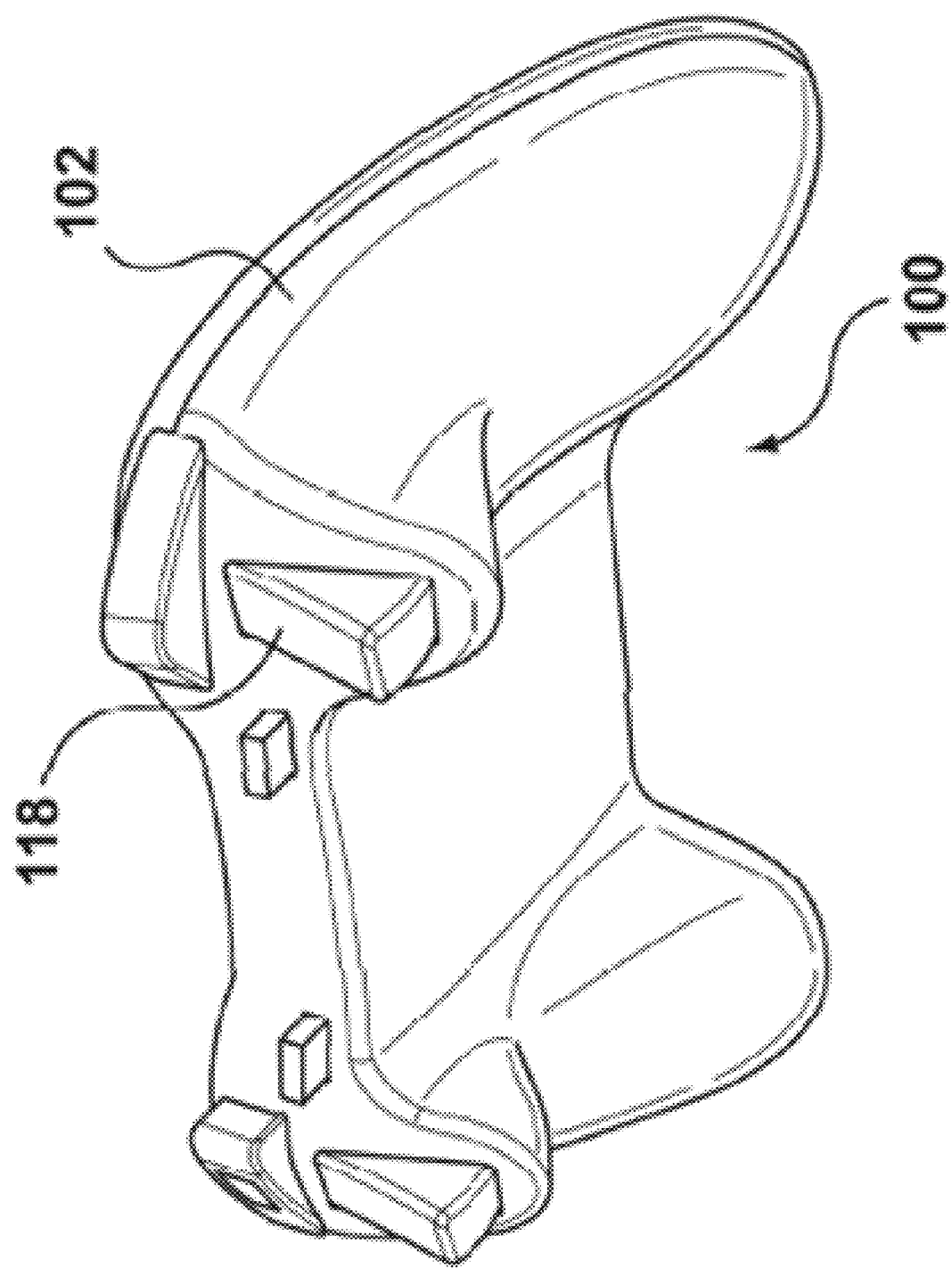
FIG. 3 illustrates another view of the controller of FIG. 2, according to an embodiment of the invention.

FIG. 2 illustrates a controller 100, according to an embodiment of the invention. In one embodiment, controller 100 is identical to controller 30 of FIG. 1. Further, FIG. 3 illustrates another view of controller 100. Controller 100 may be generally used with a gaming system that may be connected to a computer, mobile phone, television, or other similar device. Components of controller 100 illustrated in FIGS. 2 and 3 (i.e., housing 102, analog or digital stick 110, button 114, trigger 118, and rumble actuators 122 and 124) are further described below in greater detail in conjunction with FIG. 4.

Figure 4:
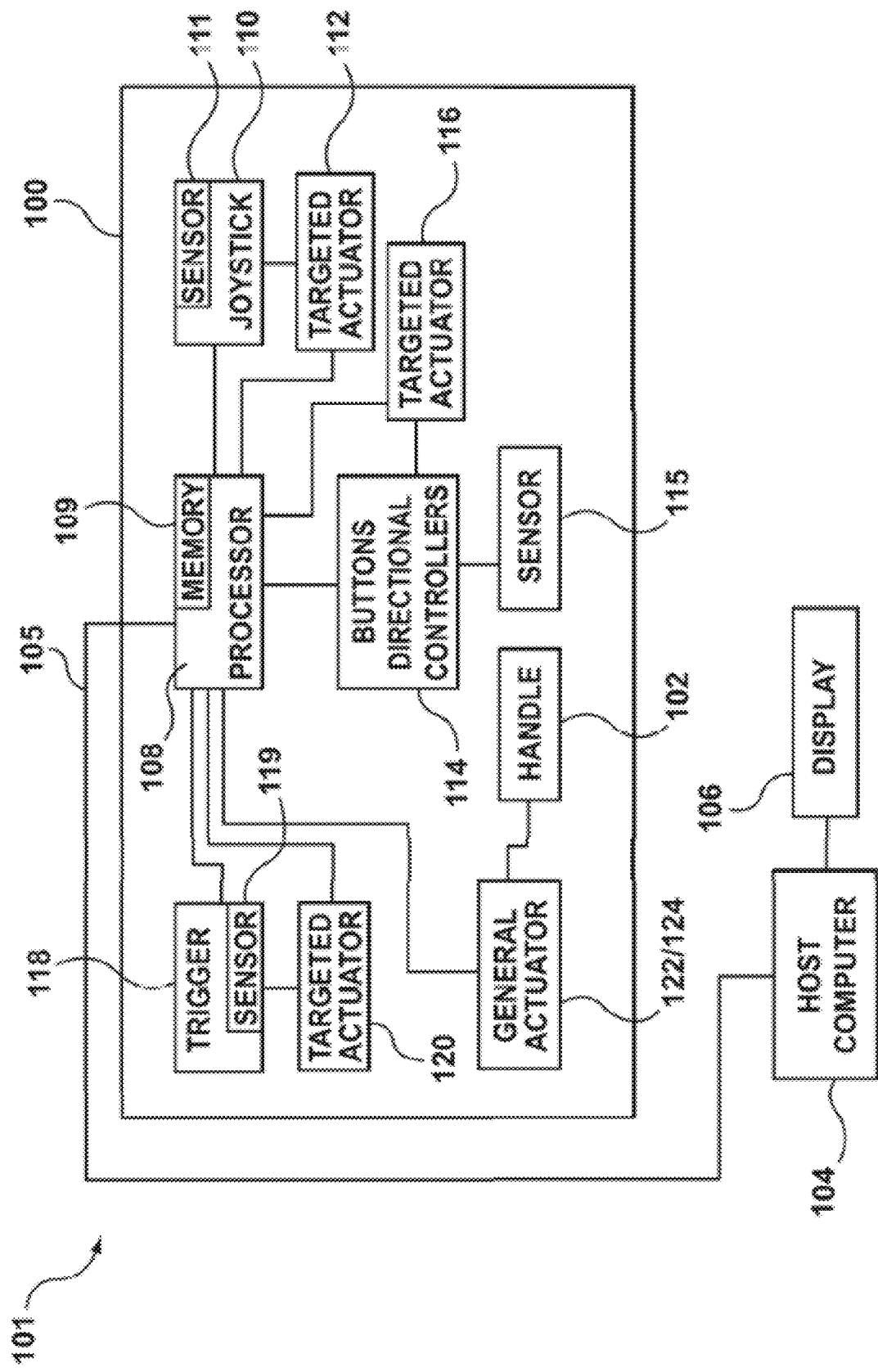
FIG. 4 illustrates a block diagram of a controller in conjunction with a host computer and display, according to an embodiment of the invention.

FIG. 4 illustrates a block diagram of controller 100 used in a gaming system 101 that further includes a host computer 104 and a display 106. As shown in the block diagram of FIG. 4, controller 100 includes a local processor 108 which communicates with host computer 104 via a connection 105. Connection 105 may be a wired connection, a wireless connection, or other types of connections known to those skilled in the art. Controller 100 may be alternatively configured to not include local processor 108, whereby all input/output signals from controller 100 are handled and processed directly by host computer 104. Host computer 104 is operably coupled to display screen 106. In an embodiment, host computer 104 is a gaming device console and display screen 106 is a monitor which is operably coupled to the gaming device console, as known in the art. In another embodiment, as known to those skilled in the art, host computer 104 and display screen 106 may be combined into a single device.

A housing 102 of controller 100 is shaped to easily accommodate two hands gripping the device, either by a left-handed user or a right-handed user. Those skilled in the art would recognize that controller 100 is merely an example embodiment of a controller of similar shape and size to many "gamepads" currently available for video game console systems, such as a Microsoft® Xbox One™ controller or a PlayStation® DualShock™ controller, and that controllers with other configurations of user input elements, shapes, and sizes may be used, including but not limited to controllers such as a Wii™ remote or Wii™ U Controller, Sony® SixAxis™ controller or Sony® Wand controller, as well as controllers shaped as real life objects (such as tennis rackets, golf clubs, baseball bats, and the like) and other shapes, or controllers with a display or head-mounted display.

Controller 100 includes several user input elements, including an analog or digital stick 110, a button 114, and a trigger 118. As used herein, user input element refers to an interface device such as a trigger, button, analog or digital stick, or the like, which is manipulated by the user to interact with host computer 104. As can be seen in FIGS. 2 and 3, and as known to those skilled in the art, more than one of each user input element and additional user input elements may be included on controller 100. Accordingly, the present description of a trigger 118, for example, does not limit controller 100 to a single trigger. Further, the block diagram of FIG. 4 shows only one (1) of each of analog or digital stick 110, button 114, and trigger 118. However, those skilled in the art would understand that multiple analog or digital sticks, buttons, and triggers, as well as other user input elements, may be used, as described above.

As can be seen in the block diagram of FIG. 4, controller 100 includes a targeted actuator or motor to directly drive each of the user input elements thereof as well as one or more general or rumble actuators 122, 124 operably coupled to housing 102 in a location where a hand of the user is generally located. More particularly, analog or digital stick 110 includes a targeted actuator or motor 112 operably coupled thereto, button 114 includes a targeted actuator or motor 116 operably coupled thereto, and trigger 118 includes a targeted actuator or motor 120 operably coupled thereto. In addition to a plurality of targeted actuators, controller 100 includes a position sensor operably coupled to each of the user input elements thereof. More particularly, analog or digital stick 110 includes a position sensor 111 operably coupled thereto, button 114 includes a position sensor 115 operably coupled thereto, and trigger 118 includes a position sensor 119 operably coupled thereto. Local processor 108 is operably coupled to targeted actuators 112, 116, 120 as well as position sensors 111, 115, 119 of analog or digital stick 110, button 114, and trigger 118, respectively. In response to signals received from position sensors 111, 115, 119, local processor 108 instructs targeted actuators 112, 116, 120 to provide directed or targeted kinesthetic effects directly to analog or digital stick 110, button 114, and trigger 118, respectively. Such targeted kinesthetic effects are discernible or distinguishable from general or rumble haptic effects produced by general actuators 122, 124 along the entire body of the controller. The collective haptic effects provide the user with a greater sense of immersion to the game as multiple modalities are being simultaneously engaged, e.g., video, audio, and haptics. Further details of a controller configured to produce haptics is described in greater detail in application Ser. No. 14/258,644, filed Apr. 22, 2014, entitled "GAMING DEVICE HAVING A HAPTIC-ENABLED TRIGGER," herein incorporated by reference in its entirety.

Figure 5:
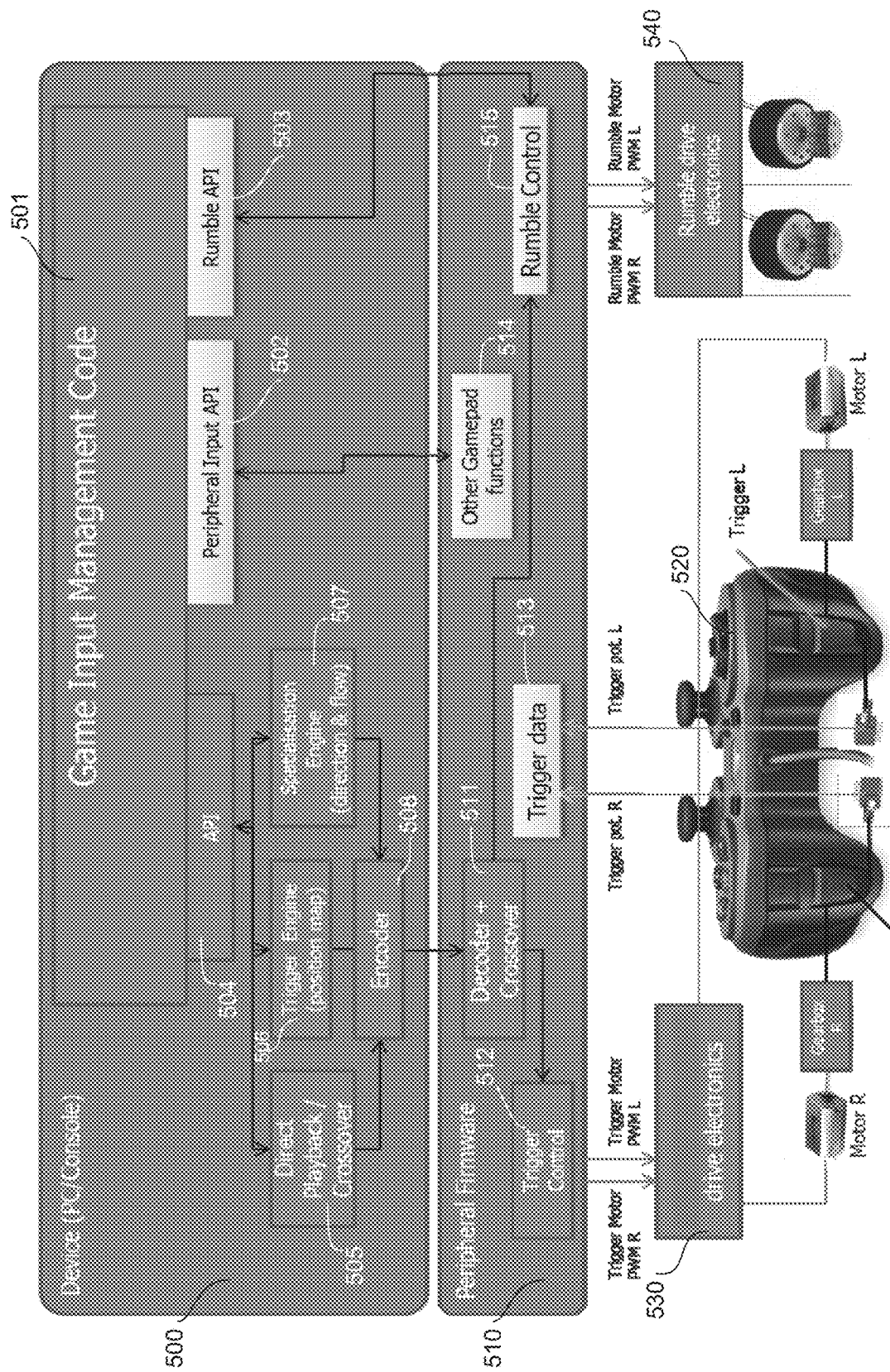
FIG. 5 illustrates a block diagram of a trigger haptic effect software stack for a system, according to an embodiment of the invention.

FIG. 5 illustrates a block diagram of a trigger haptic effect software stack for a system, according to an embodiment of the invention. The trigger haptic effect software stack is implemented on a system, such as system 10 of FIG. 1. In the illustrated embodiment, the system includes the following components: device 500, peripheral firmware 510, and controller 520. Device 500 can be any type of computer device, such as a personal computer, tablet, smartphone, or console (e.g., video game console). Peripheral firmware 510 is firmware for one or more peripheral devices (e.g., controllers) that can be operably connected to device 500. Controller 520 is an example of a peripheral that is operably connected to device 500. Controller 520 can be a video game controller. In one embodiment, controller 520 can be identical to controller 30 of FIG. 1, and controller 100 of FIGS. 2, 3, and 4.

Device 500 includes game input management code 501. Game input management code 501 includes a set of computer-readable instructions that manage input provided by controller 520 in the context of a game application, or other type of application, executed within device 500. Device 500 further includes peripheral input application programming interface ("API") 502. Peripheral input API 502 includes a set of computer-readable functions or routines that allow game input management code 501 to interact with peripheral firmware 510 in order to receive and manage input provided by controller 520. Device 500 further includes rumble API 503. Rumble API includes a set of computer-readable functions or routines that allow game input management code 501 to interact with peripheral firmware 510 in order to transmit rumble instructions to one or more rumble motors, or rumble actuators, of controller 520 (e.g., rumble motors L and R, as illustrated in FIG. 5). A rumble instruction can cause a rumble motor, or rumble actuator, of controller 520 to produce a general or rumble haptic effect.

Device 500 further includes trigger haptic effect API 504 (identified in FIG. 5 as "API"). Trigger haptic effect API 504 includes a set of computer-readable functions or routines that are exposed to game input management code 501, and that allow game input management code 501 to interact with peripheral firmware 510 in order to transmit haptic instructions to controller 520, such as trigger instructions to one or more triggers of controllers 520 (e.g., triggers L and R, as illustrated in FIG. 5). A haptic instruction can cause one or more targeted motors, or targeted actuators, of controller 520 to produce a haptic effect at one or more user input elements of controllers 520. A trigger instruction is a specific type of haptic instruction that can cause one or more targeted motors, or targeted actuators, of controller 520 (e.g., motors L and R, as illustrated in FIG. 5) to produce a trigger haptic effect at one or more triggers of controllers 520 (e.g., triggers L and R, as illustrated in FIG. 5). A trigger haptic effect is a specific type of haptic effect that is experienced at a trigger of a controller, such as controller 520. Trigger haptic effect API 504 can store one or more trigger haptic effect definitions. A haptic effect definition is a data structure that includes haptic data, such as a haptic signal, that is pre-defined and that can be stored within a storage, such as a haptic file or haptic stream, and that can be sent to one or more rumble motors, rumble actuators, targeted motors, or targeted actuators, to produce a haptic effect at a component, or user input element, of controller 520. The haptic data can include one or more attributes of the corresponding haptic effect, where the attributes can be stored as parameters. Example parameters of a haptic effect definition include an amplitude parameter, a frequency parameter, a waveform parameter, an envelope parameter, a magnitude (or strength) parameter, and a duration parameter. A trigger haptic effect definition is a specific type of haptic effect definition that can be sent to one or more motors, or actuators, of controller 520 (e.g., motors L and R, as illustrated in FIG. 5) to produce a trigger haptic effect at one or more triggers of controllers 520 (e.g., triggers L and R, as illustrated in FIG. 5).

According to the embodiment, trigger haptic effect API 504 can allow game input management code 501 to interact with direct playback/crossover 505, trigger engine 506, and spatialization engine 507, and can further manage direct playback/crossover 505, trigger engine 506, and spatialization engine 507 according to requests invoked by game input management code 501. Further, trigger haptic effect API 504 can store data required for communication with peripheral firmware 510, and required for generation of one or more trigger haptic effects. In an alternate embodiment, trigger haptic effect API 504 can reside within peripheral firmware 510 rather than device 500.

Device 500 further includes direct playback/crossover 505. Direct playback/crossover 505 receives haptic data as input, produces haptic data as output, and transmits haptic data to one or more targeted motors, or targeted actuators, of controller 520 (e.g., motors L and R, as illustrated in FIG. 5). In certain embodiments, direct playback/crossover 505 can output the input haptic data directly, without modifying a format of the input haptic data. This results in an "as-is" playback of the input haptic data. In other embodiments, direct playback/crossover 505 can convert the haptic data that is input from a first format to a second format, and can further output the converted haptic data. Depending on the type of playback, direct playback/crossover 505 can optionally use a programmable crossover to convert the haptic data. By converting the haptic data, device 500 can "deconstruct" the haptic effect and playback the haptic effect at multiple actuators faithfully. In one embodiment, the format of the haptic data can be a Haptic Elementary Stream ("HES") format. A HES format is a file or data format for representing haptic data that can be streamed to a device. The haptic data can be represented in a manner that is identical or similar to how uncompressed sound is represented, although the haptic data can be encrypted within the HES format. In an alternate embodiment, direct playback/crossover 505 can reside within peripheral firmware 510 rather than device 500.

Device 500 further includes trigger engine 506. Trigger engine 506 can receive haptic data, such as a trigger haptic effect definition, and can modify the haptic data based on data, such as trigger data (e.g., trigger data 513 as illustrated in FIG. 5) received from controller 520. Trigger data is data that includes one or more parameters that indicate a position and/or range of one or more triggers of controller 520 (e.g., triggers L and R as illustrated in FIG. 5). Trigger engine 506 can further transmit haptic instructions to controller 520. For example, trigger engine 506 can transmit trigger instructions to one or more triggers of controller 520 (e.g., triggers L and R, as illustrated in FIG. 5). As previously described, a trigger instruction can cause one or more targeted motors, or targeted actuators, of controller 520 (e.g., motors L and R, as illustrated in FIG. 5) to produce a trigger haptic effect at one or more triggers of controllers 520 (e.g., triggers L and R, as illustrated in FIG. 5). Thus, in one embodiment, by modifying the haptic data of the trigger haptic effect definition, trigger engine 506 can cause a specific trigger haptic effect to be experienced at a trigger based on a position and/or range of the trigger. In another embodiment, by modifying the haptic data of the trigger haptic effect definition, trigger engine 506 can scale a trigger haptic effect for one or more targeted motors, or targeted actuators, of controller 520 (e.g., motors L and R, as illustrated in FIG. 5) based on a position and/or range of the trigger. Trigger engine 506 can further store one or more haptic effect definitions, such as trigger haptic effect definitions. In an alternate embodiment, trigger engine 506 can reside within peripheral firmware 510 rather than device 500.

Device 500 further includes spatialization engine 507 (identified in FIG. 5 as "spatialisation engine"). Spatialization engine 507 can receive haptic data, such as a trigger haptic effect definition, and can modify the haptic data based on spatialization data. Spatialization data can include data that indicates a desired direction and/or flow of a haptic effect, such as a trigger haptic effect. In certain embodiments, spatialization engine 507 can receive spatialization data that includes a direction and/or flow from game input management code 501. Further, spatialization data can also include one or more positions of one or more hands of a user located on controller 520. In certain embodiments, spatialization engine 507 can receive spatialization data that includes one or more hand positions from controller 520. Further, in certain embodiments, spatialization engine 507 can receive spatialization data that includes a position of a user's character within a game application as communicated by game input management code 501.

According to the embodiment, spatialization engine 507 can modify the haptic data so that a haptic effect, such as a trigger haptic effect, is scaled for one or more rumble motors, or rumble actuators, of controller 520 (e.g., rumble motors L and R, as illustrated in FIG. 5), and that the haptic effect is also scaled for one or more targeted motors, or targeted actuators, of controller 520 (e.g., motors L and R, as illustrated in FIG. 5). In other words, spatialization engine 507 can modify the haptic data that is sent to each motor or actuator, and thus, modify the haptic effect that is experienced at each motor or actuator, in order to convey a sense of direction and flow of an overall haptic effect. For example, in order to emphasize a haptic effect experienced at a motor or actuator, spatialization engine 507 may scale one or more portions of the haptic effect. For example, spatialization engine 507 may scale haptic data that is sent to the motor or actuator that causes the haptic effect to be experienced, causing the haptic effect to be more pronounced (e.g., increased magnitude, duration, etc.). Additionally, spatialization engine 507 may scale haptic data that is sent to other motors or actuators, causing other haptic effects that are experienced at those motors or actuators to be less pronounced (e.g., decreased magnitude, duration, etc.). In certain embodiments, spatialization engine 507 can modify the haptic data in real-time. Further, in certain embodiments, spatialization engine 507 can have non-linear relationships between inputs and motor, or actuator, outputs in order to exaggerate an overall trigger haptic effect. In an alternate embodiment, spatialization engine 507 can reside within peripheral firmware 510 rather than device 500.

Device 500 further includes encoder 508. Encoder 508 encodes haptic data received from direct playback/crossover 505, trigger engine 506, and/or spatialization engine 507 into a format. In one embodiment, the format can be an HES format. Encoder 508 further transmits the encoded haptic data to peripheral firmware 510.

Peripheral firmware 510 includes decoder and crossover 511. Decoder and crossover 511 receives the encoded haptic data from encoder 508 and decodes the encoded haptic data. In certain embodiments, decoder and crossover 511 computes a programmable crossover in order to decode the encoded haptic data. In some of these embodiments, decoder and crossover 511 computes the programmable crossover in real-time. Peripheral firmware 510 further includes trigger control 512. Trigger control 512 is a low-level control API for one or more targeted motors, or targeted actuators, of controller 520 (e.g., motors L and R, as illustrated in FIG. 5). Trigger control 512 can receive a trigger instruction from device 500, can convert the trigger instruction into a low-level trigger instruction for a specified targeted motor, or targeted actuator, of controller 520, and can transmit the low-level trigger instruction to the specified targeted motor, or targeted actuator, of controller 520. The low-level trigger instruction can cause the specified targeted motor, or targeted actuator, to produce a trigger haptic effect at a specified trigger of controller 520.

Peripheral firmware 510 further includes trigger data 513. Trigger data 513, as previously described, is data that includes one or more parameters, such as one or more parameters that indicate a position and/or range of one or more triggers of controller 520 (e.g., triggers L and R as illustrated in FIG. 5). Trigger data 513 can be received from controller 520 by peripheral firmware 510. Peripheral firmware 510 can further store trigger data 513, and can further transmit trigger data 513 to device 500. Peripheral firmware 510 further includes other gamepad functions 514, which are functions of controller 520 that can be managed by peripheral firmware 510. Such functions can include such functions as wired/wireless communications, input reporting, protocol implementation, power management, etc. Peripheral firmware 510 further includes rumble control 515. Rumble control 515 is a low-level control API for one or more rumble motors, or rumble actuators, of controller 520 (e.g., rumble motors L and R, as illustrated in FIG. 5). Rumble control 515 can receive a rumble instruction from device 500, can convert the rumble instruction into a low-level rumble instruction for a specified rumble motor, or rumble actuator, of controller 520, and can transmit the low-level trigger instruction to the specified rumble motor, or rumble actuator, of controller 520.

Controller 520 includes triggers L and R. Controller 520 further includes gear boxes L and R and motors L and R. Motor L and gearbox L are operably coupled to trigger L within controller 520. Likewise, motor R and gearbox R are operably coupled to trigger R within controller 520. When motor L receives a trigger instruction, motor L and gearbox L collectively cause a trigger haptic effect to be experienced at trigger L. Likewise, when motor R receives a trigger instruction, motor R and gearbox R collectively cause a trigger haptic effect to be experienced at trigger R. According to the embodiment, peripheral firmware 510 sends trigger instructions to motors L and R of controller 520 using drive electronics 530. Controller 520 further includes potentiometers L and R. Potentiometer L can detect a position and/or range of trigger L, and can further send the detected position and/or range of trigger L to peripheral firmware 510 as trigger data. Likewise, potentiometer R can detect a position and/or range of trigger R, and can further send the detected position and/or range of trigger R to peripheral firmware 510 as trigger data. In one embodiment, potentiometers L and R can each be replaced with another type of sensor, such as a hall effect sensor. Controller 520 further includes rumble motors L and R. When rumble motor L receives a rumble instruction, rumble motor L causes a haptic effect to be experienced along a left body of controller 520. Likewise, when rumble motor R receives a rumble instruction, rumble motor R cause a haptic effect to be experienced along a right body of controller 520. According to the embodiment, peripheral firmware 510 sends rumble instructions to rumble motors L and R of controller 520 using rumble drive electronics 530.

In an alternate embodiment, one or more targeted motors, or targeted actuators, can be operably coupled to one or more user input elements (such as one or more digital buttons, one or more analog buttons, one or more bumpers, one or more directional pads, one or more analog or digital sticks, one or more driving wheels, one or more sliders) of controller 520. According to the alternate embodiment, peripheral firmware 510 can sends instructions to the one or more targeted motors or targeted actuators, causing the one or more targeted motors or targeted actuators to produce haptic effects that are experienced at the one or more user input elements of controller 520.

In one embodiment, as previously described, a system (such as system 10 of FIG. 1) can receive user input data for a user input element of a peripheral device, such as a controller or gamepad, while a haptic effect is being played at the user input element of the peripheral device, or otherwise being played at the peripheral device, where the haptic effect is based on an original haptic effect definition. As a specific example, the system can receive trigger data for a trigger of a controller, while a trigger haptic effect is being played at the trigger of the peripheral device. The system can determine that the haptic effect will not be experienced as originally intended when the haptic effect definition was authored based on the received user input data. For example, a vibrotactile haptic effect with a light frequency (e.g., 200 hertz ("Hz")) will normally produce a small vibration on a trigger when applied to the trigger. However, if a user pulls the trigger all the way in, and/or if the user is gripping the trigger tightly, the vibrotactile haptic effect will most likely not be felt by the user, unless the vibrotactile haptic effect is modified to increase the magnitude and the frequency. As another example, a kinesthetic haptic effect that produces a push force against a user's finger on a trigger will likely not be felt by the user if the user is pulling the trigger, unless the kinesthetic haptic effect is modified to increase the magnitude (i.e., strength) or the frequency.

The system can further programmatically modify the haptic effect definition so that a modified haptic effect is similar or identical to an original haptic effect as originally intended, even in light of the received user input data. In other words, the system can programmatically modify the haptic effect definition to compensate for the diminishment of the original haptic effect caused by a user interaction with the user input element that is represented by the received user input data. By programmatically modifying the haptic effect definition, the system can programmatically modify one or more parameters of the haptic data included within the haptic effect definition. Such parameters can include: a magnitude (or strength) parameter; a frequency parameter; a directionality parameter; an attack parameter; a decay parameter; or a duration parameter. Alternatively, by programmatically modifying the haptic effect definition, the system can generate a separate haptic effect definition and send the separate haptic effect definition to a separate motor or actuator in order to generate a separate haptic effect, in concurrence with a generation of the original haptic effect, where the separate haptic effect complements the original haptic effect. The programmatic modification of the haptic effect definition can be accomplished according to a modification algorithm of the system. The system can further send a haptic instruction and the modified haptic effect definition to an actuator or motor within the peripheral device. The actuator or motor can further output a modified haptic effect based on the modified haptic effect definition.

In one embodiment, the haptic instruction can be a trigger instruction and the modified haptic effect definition can be a modified trigger haptic effect definition. Further, the trigger instruction and the modified trigger haptic effect definition can be sent to a targeted actuator or motor operably coupled to a trigger. As an example, a trigger haptic effect definition can define a bi-directional push/pull force with a specified magnitude (or strength) that is applied to the trigger by a targeted actuator or motor that is operably coupled to the trigger. Further, a potentiometer, hall sensor, or other type of sensor can determine whether a user is pulling or pushing the trigger. The system can programmatically determine, when a user is pulling the trigger, how much of a push force a targeted actuator or motor that is operably coupled to the trigger is required to apply to the trigger to compensate for the pulling of the trigger by the user. The system can programmatically modify a trigger haptic effect definition so that the targeted actuator or motor applies a sufficient push force to compensate for the pulling of the trigger by the user. The system can programmatically modify the trigger haptic effect definition by modifying at least one of the following parameters of the trigger haptic effect definition: a magnitude (i.e., strength) parameter; a frequency parameter; a duration parameter; a directionality parameter; an attack parameter; or a decay parameter. In an alternate embodiment, the system can generate a haptic effect definition that defines a haptic effect so that one or more general actuators or motors that are within the peripheral device, but not operably coupled to the trigger, can generate the defined haptic effect that complements the bi-directional push/pull force applied by the targeted actuator or motor that is operably coupled to the trigger. In yet another alternate embodiment, the haptic effect generated by the one or more general actuators or motors can replace the bi-directional push/pull force applied by the targeted actuator or motor that is operably coupled to the trigger.

As previously described, a user input element can be, for example, a digital button, an analog button, a bumper, a directional pad, an analog or digital stick, a driving wheel, a slider, or a trigger. Further, user input data can be, for example, a position of the user input element, a closure rate of the user input element, or a force applied to the user input element. In one embodiment, user input data can further include data that is derived from a position of the user input element, a closure rate of the user input element, or a force applied to the user input element. When the user input element is a trigger, the user input data can be trigger data, where trigger data can be, for example, a position of the trigger, a closure rate of the trigger, or a force applied to the trigger. User input data, such as trigger data, can be generated by a potentiometer, hall sensor, or other type of sensor that is operably coupled to a user input element, such as a trigger.

In one embodiment, the peripheral device can detect motion, such as motion of a user input element, where the motion is multi-axis motion (i.e., motion across two or more axes of a peripheral device). In this embodiment, motion data can be generated and sent to the system, where the system can receive the motion data. The system can further programmatically modify the haptic effect definition in light of the received motion data. For example, the system can modify the haptic effect definition to pause a haptic effect during the multi-axis motion. As another example, the system can modify the haptic effect definition to reduce a frequency of a haptic effect when an upward motion moves to a downward motion.

Figure 6:
FIG. 6 illustrates an original trigger haptic effect definition that can produce an original trigger haptic effect that can be experienced at a trigger of a controller, when the trigger is not pressed, according to an embodiment of the invention.

FIG. 6 illustrates an original trigger haptic effect definition 600 that can produce an original trigger haptic effect that can be experienced at a trigger 610 of a controller, when trigger 610 is not pressed, according to an embodiment of the invention. According to the embodiment, original trigger haptic effect definition 600 includes a waveform that is generated by one or more parameters. In an embodiment, the one or more parameters can include: a magnitude (strength) parameter; a frequency parameter; a duration parameter; a directionality parameter; an attack parameter; and a decay parameter. A system can receive trigger data that includes a position of trigger 610, where the position of trigger 610 indicates that trigger 610 is not being pressed. The system can determine that no modification to original trigger haptic effect definition 600 is necessary. The system can further send original trigger haptic effect definition 600 to the controller, where a targeted motor or actuator can apply a force to trigger 610 based on original trigger haptic effect definition 600 to produce a trigger haptic effect at trigger 610.

Figure 7:
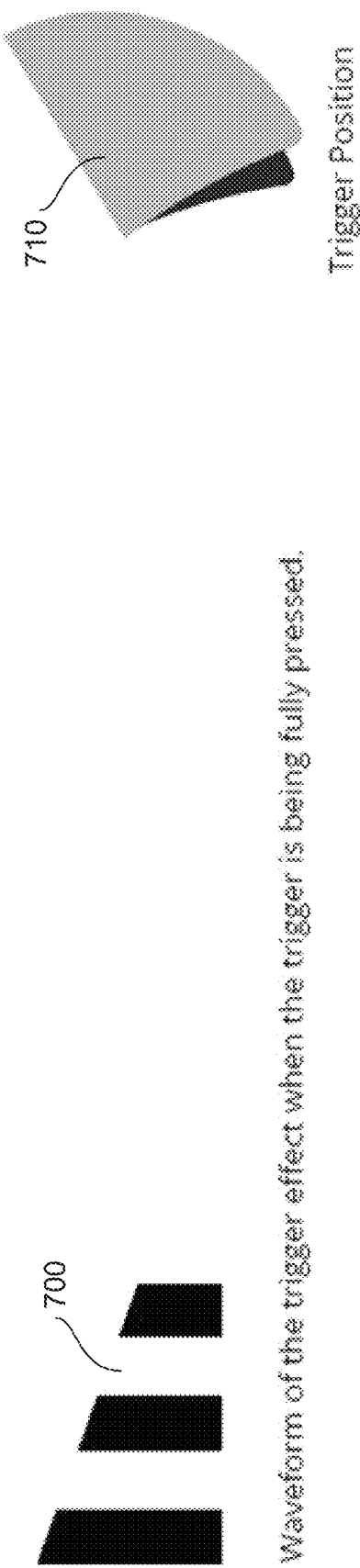
FIG. 7 illustrates a modified trigger haptic effect definition that can produce a modified trigger haptic effect that can be experienced at a trigger of a controller, when the trigger is fully pressed, according to an embodiment of the invention.

FIG. 7 illustrates a modified trigger haptic effect definition 700 that can produce a modified trigger haptic effect that can be experienced at a trigger 710 of a controller, when the trigger is fully pressed, according to an embodiment of the invention. According to the embodiment, modified trigger haptic effect definition 700 includes a waveform that is generated by one or more parameters. In an embodiment, the one or more parameters can include: a magnitude (strength) parameter; a frequency parameter; a duration parameter; a directionality parameter; an attack parameter; and a decay parameter. As illustrated in FIG. 7, the waveform of modified trigger haptic effect definition 700 is significantly different from the waveform of original trigger haptic effect definition 600. More specifically, the differences in the waveform of modified trigger haptic effect definition 700 and original trigger haptic effect definition 600 include changes in magnitude and frequency. The waveform of original trigger haptic effect definition 600 is approximately a 100 Hz haptic effect waveform that changes to a shorter haptic effect waveform for modified trigger haptic effect definition 700 with a lower frequency and more significant decay. A system can receive trigger data that includes a position of trigger 710, where the position of trigger 710 indicates that trigger 710 is being fully pressed. The system can determine that original trigger haptic effect definition 600 will not produce an "ideal" trigger haptic effect at trigger 710 in light of trigger 710 being fully pressed. More specifically, significant attributes of a trigger haptic effect produced by original trigger haptic effect definition 600 can be lost when a significant amount of force is applied at trigger 710. The system can further modify original trigger haptic effect definition 600 by converting original trigger haptic effect definition 600 to modified haptic effect definition 700. The system can programmatically perform this modification by programmatically modifying one or more parameters of original trigger haptic effect definition 600. The system can further send modified trigger haptic effect definition 700 to the controller, where a targeted motor or actuator can apply a force to trigger 710 based on modified trigger haptic effect definition 700 to produce a modified trigger haptic effect at trigger 710. The modified trigger haptic effect can produce a "more ideal" haptic effect experience in light of the significant amount of force being applied at trigger 710.

Figure 8:
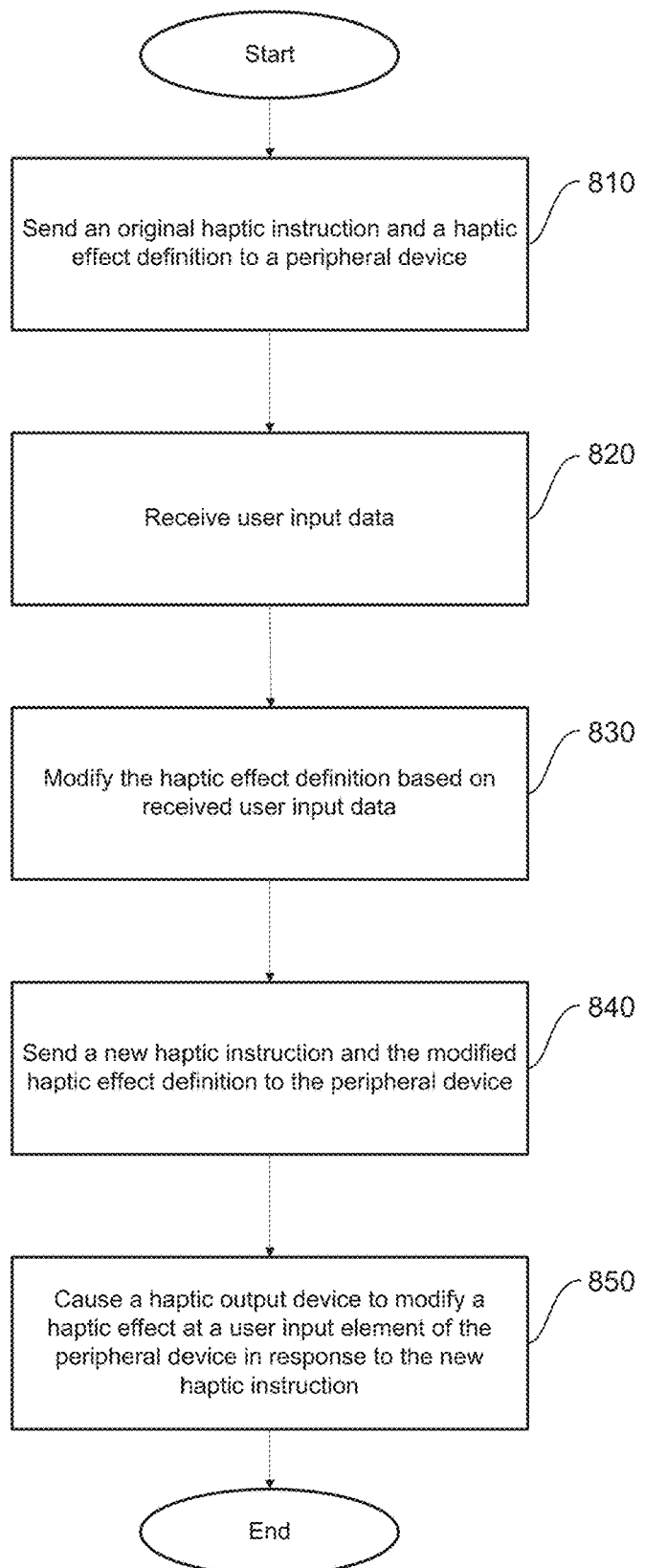
FIG. 8 illustrates a flow diagram of the functionality of a haptic trigger modification module, according to an embodiment of the invention.

FIG. 8 illustrates a flow diagram of the functionality of a haptic trigger modification module (such as haptic trigger modification module 16 of FIG. 1), according to an embodiment of the invention. In one embodiment, the functionality of FIG. 8, as well as the functionality of FIG. 9, described below, are implemented by software stored in memory or other computer-readable or tangible media, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 810. At 810, an original haptic instruction and a haptic effect definition are sent to a peripheral device. The original haptic instruction can cause a haptic output device to generate a haptic effect based on the haptic effect definition at a user input element of a peripheral device, or within the peripheral device. The haptic effect definition can include haptic data. In certain embodiments, the haptic data can include one or more parameters. The parameters can include at least one of: a magnitude parameter; a frequency parameter; a duration parameter; a directionality parameter; an attack parameter; or a decay parameter. In certain embodiments, the original haptic instruction can be an original trigger instruction, and the haptic effect definition can be a trigger haptic effect definition. In these embodiments, the original trigger instruction can cause a targeted output device to generate a trigger haptic effect based on the trigger haptic effect definition at a trigger of the peripheral device. In certain embodiments, the peripheral device can be a controller or a gamepad. In certain embodiments, 810 can be omitted. The flow proceeds to 820.

At 820, user input data is received from the peripheral device. The user data can include at least one of: a position of the user input element of the peripheral device; or a force applied to the user input element of the peripheral device. In embodiments where the user input element is a trigger, the user input data can be trigger data. The trigger data can include at least one of: a position of the trigger; a closure rate of the trigger; or a force applied to the trigger. The flow then proceeds to 830.

At 830, the haptic effect definition is modified based on the received user input data. In embodiments where the received user input data is trigger data, the haptic effect definition is modified based on the received trigger data. In certain embodiments, the haptic effect definition can be modified by modifying the haptic data of the haptic effect definition. In some of these embodiments, the haptic effect definition can be modified by modifying one or more parameters of the haptic data. Modifying the one or more parameters of the haptic data can include modifying at least one of: a magnitude parameter; a frequency parameter; a directionality parameter; an attack parameter; a decay parameter; or a duration parameter. In other embodiments, the haptic effect definition can be modified by: creating a new haptic effect definition; sending a haptic instruction and the new haptic effect definition to the peripheral device; and causing a general haptic output device to generate a haptic effect based on the new haptic effect definition at the peripheral device in response to the haptic instruction. In some embodiments, the haptic effect definition can be modified programmatically. The flow then proceeds to 840.

At 840, a new haptic instruction and the modified haptic effect definition are sent to the peripheral device. In certain embodiments, the new haptic instruction can be a new trigger instruction. The flow then proceeds to 850.

At 850, the new haptic instruction causes a haptic output device to modify a haptic effect based on the modified haptic effect definition at the user input element of the peripheral device. In certain embodiments, the haptic output device can modify the haptic effect by generating a modified haptic effect based on the modified haptic effect definition, where the modified haptic effect replaces an original haptic effect. In other embodiments, the haptic output device can modify the haptic effect by generating a new haptic effect based on the modified haptic effect definition, where the new haptic effect can be generated concurrently with an original haptic effect. In certain embodiments, the haptic output device can be a targeted haptic output device, and the targeted haptic output device can modify the haptic effect at the trigger of the peripheral device. In certain embodiments, the targeted haptic output device can be a targeted actuator. In some of those embodiments, the targeted actuator can be a targeted motor. The flow then ends.

Figure 9:
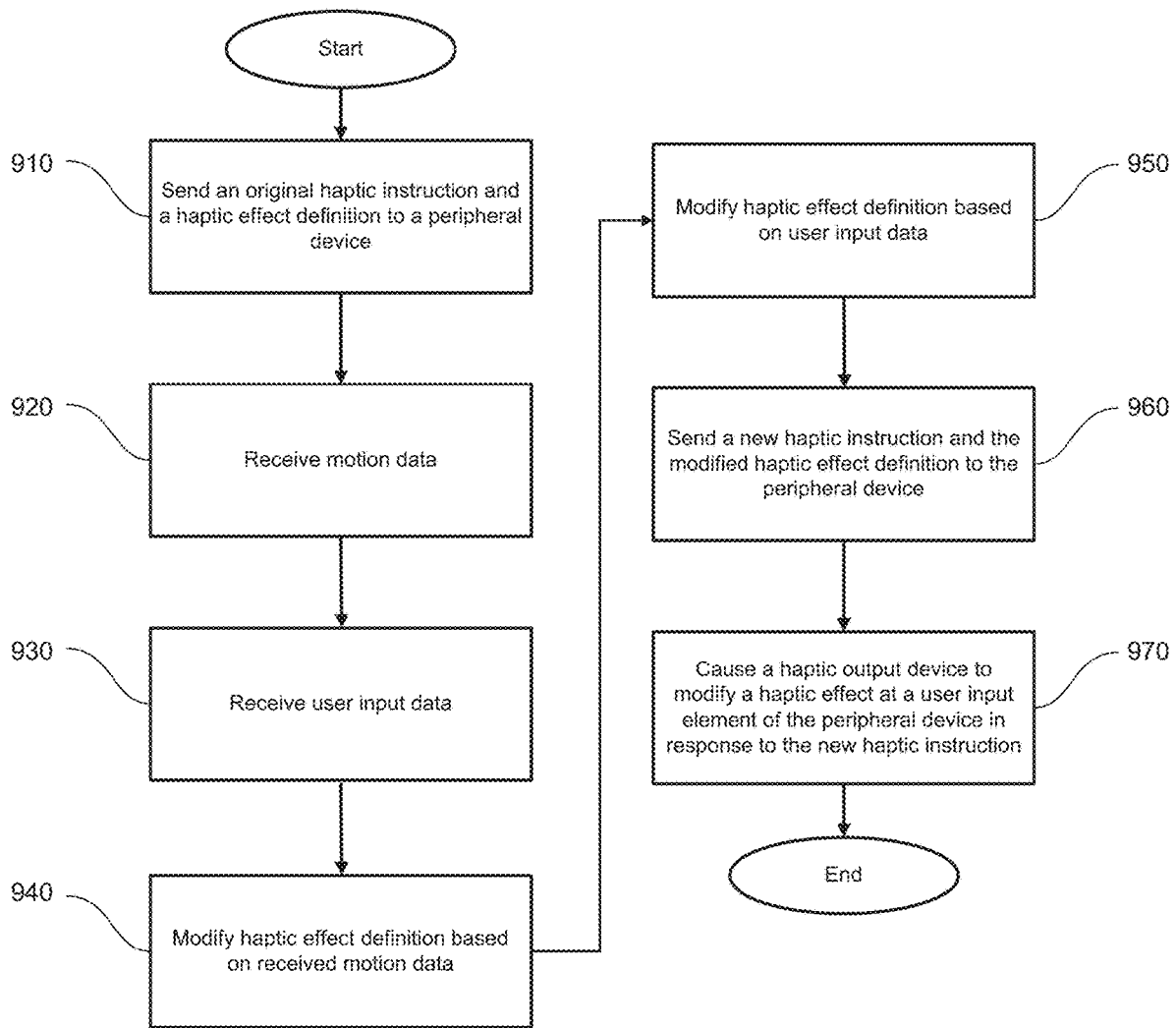
FIG. 9 illustrates a flow diagram of the functionality of a haptic trigger modification module, according to another embodiment of the invention.

FIG. 9 illustrates a flow diagram of the functionality of a haptic trigger modification module, according to another embodiment of the invention. The flow begins and proceeds to 910. At 910, an original haptic instruction and a haptic effect definition are sent to a peripheral device. The original haptic instruction can cause a haptic output device to generate a haptic effect based on the haptic effect definition at a user input element of a peripheral device, or within the peripheral device. The haptic effect definition can include haptic data. In certain embodiments, the haptic data can include one or more parameters. The parameters can include at least one of: a magnitude parameter; a frequency parameter; a duration parameter; a directionality parameter; an attack parameter; or a decay parameter. In certain embodiments, the original haptic instruction can be an original trigger instruction, and the haptic effect definition can be a trigger haptic effect definition. In these embodiments, the original trigger instruction can cause a targeted output device to generate a trigger haptic effect based on the trigger haptic effect definition at a trigger of the peripheral device. In certain embodiments, the peripheral device can be a controller or a gamepad. In certain embodiments, 910 can be omitted. The flow proceeds to 920.

At 920, motion data is received from the peripheral device. The motion data can include at least one of: a motion of the user input element from a first axis of the peripheral device to a second axis of the peripheral device, or a motion of the user input element from a first direction within the peripheral device to a second direction within the peripheral device. The flow proceeds to 930.

At 930, user input data is received from the peripheral device. The user data can include at least one of: a position of the user input element of the peripheral device; or a force applied to the user input element of the peripheral device. In embodiments where the user input element is a trigger, the user input data can be trigger data. The trigger data can include at least one of: a position of the trigger; a closure rate of the trigger; or a force applied to the trigger. The flow then proceeds to 940.

At 940, the haptic effect definition is modified based on the received motion data. In certain embodiments, the haptic effect definition can be modified by modifying the haptic data of the haptic effect definition. In some of these embodiments, the haptic effect definition can be modified by modifying one or more parameters of the haptic data. Modifying the one or more parameters of the haptic data can include modifying at least one of: a magnitude parameter; a frequency parameter; a directionality parameter; an attack parameter; a decay parameter; or a duration parameter. In other embodiments, the haptic effect definition can be modified by: creating a new haptic effect definition; sending a haptic instruction and the new haptic effect definition to the peripheral device; and causing a general haptic output device to generate a haptic effect based on the new haptic effect definition at the peripheral device in response to the haptic instruction. In some embodiments, the haptic effect definition can be modified programmatically. The flow then proceeds to 950.

At 950, the haptic effect definition is modified based on the received user input data. In embodiments where the received user input data is trigger data, the haptic effect definition is modified based on the received trigger data. In certain embodiments, the haptic effect definition can be modified by modifying the haptic data of the haptic effect definition. In some of these embodiments, the haptic effect definition can be modified by modifying one or more parameters of the haptic data. Modifying the one or more parameters of the haptic data can include modifying at least one of: a magnitude parameter; a frequency parameter; a directionality parameter; an attack parameter; a decay parameter; or a duration parameter. In other embodiments, the haptic effect definition can be modified by: creating a new haptic effect definition; sending a haptic instruction and the new haptic effect definition to the peripheral device; and causing a general haptic output device to generate a haptic effect based on the new haptic effect definition at the peripheral device in response to the haptic instruction. In some embodiments, the haptic effect definition can be modified programmatically. The flow then proceeds to 960.

At 960, a new haptic instruction and the modified haptic effect definition are sent to the peripheral device. In certain embodiments, the new haptic instruction can be a new trigger instruction. The flow then proceeds to 970.

At 970, the new haptic instruction causes a haptic output device to modify a haptic effect based on the modified haptic effect definition at the user input element of the peripheral device. In certain embodiments, the haptic output device can modify the haptic effect by generating a modified haptic effect based on the modified haptic effect definition, where the modified haptic effect replaces an original haptic effect. In other embodiments, the haptic output device can modify the haptic effect by generating a new haptic effect based on the modified haptic effect definition, where the new haptic effect can be generated concurrently with an original haptic effect. In certain embodiments, the haptic output device can be a targeted haptic output device, and the targeted haptic output device can modify the haptic effect at the trigger of the peripheral device. In certain embodiments, the targeted haptic output device can be a targeted actuator. In some of those embodiments, the targeted actuator can be a targeted motor. The flow then ends.

Thus, in one embodiment, a system can modify a haptic effect that is experienced at a peripheral device, such as a controller or gamepad. The haptic effect can be a trigger haptic effect that is experienced at a trigger of the peripheral device. The haptic effect can be modified based on user input data that is received by the system, where the user input data can include a position of a user input element and/or a force applied to the user input element. By modifying haptic feedback experienced at a peripheral device, and in particular, haptic feedback experienced at a trigger of the peripheral device, based on a user's interaction with the peripheral device, a more realistic and immersive gaming experience can be provided.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A computer-implemented method for modifying a haptic effect experienced at a user input element, the computer-implemented method comprising:
   receiving data associated with a user interaction from a peripheral device;
   modifying a haptic effect definition based on the data to generate a modified haptic effect definition that compensates for a change to an original haptic effect caused by the user interaction so as to maintain the original haptic effect;
   sending an instruction and the modified haptic effect definition to the peripheral device; and
   causing a haptic output device to modify a haptic effect based on the modified haptic effect definition at the user input element of the peripheral device in response to the instruction.

2. The computer-implemented method of claim 1,
   wherein the haptic effect definition comprises haptic data; and
   wherein the modifying the haptic effect definition comprises modifying the haptic data of the haptic effect definition.

3. The computer-implemented method of claim 2,
   wherein the modifying the haptic data of the haptic effect definition comprises modifying at least one of a magnitude parameter, a frequency parameter, a directionality parameter, an attack parameter, a decay parameter, or a duration parameter.

4. The computer-implemented method of claim 1, further comprising:
   receiving motion data; and
   modifying the haptic effect definition based on the motion data.

5. The computer-implemented method of claim 4,
   wherein the motion data comprises at least one of a motion of a user input element of the peripheral device from a first axis to a second axis, or a motion of the user input element from a first direction to a second direction.

6. The computer-implemented method of claim 4,
   wherein the data further comprises one of a closure rate of the user input element or a force applied to the user input element.

7. The computer-implemented method of claim 1,
   wherein the data comprises a position of the user input element;
   wherein the position is detected by a sensor coupled to the user input element; and
   wherein the user input element is one of a digital button, analog button, bumper, directional pad, analog stick, digital stick, driving wheel, slider, or trigger.

8. A system for modifying a haptic effect experienced at a user input element, the system comprising:
   a processor; and
   a memory storing one or more programs for execution by the processor, the one or more programs including instructions for:
   receiving data associated with a user interaction from a peripheral device;
   modifying a haptic effect definition based on the data to generate a modified haptic effect definition that compensates for a change to an original haptic effect caused by the user interaction so as to maintain the original haptic effect;
   sending an instruction and the modified haptic effect definition to the peripheral device; and
   causing a haptic output device to modify a haptic effect based on the modified haptic effect definition at the user input element of the peripheral device in response to the instruction.

9. The system of claim 8,
   wherein the haptic effect definition comprises haptic data; and
   wherein the modifying the haptic effect definition comprises modifying the haptic data of the haptic effect definition.

10. The system of claim 9,
    wherein the modifying the haptic data of the haptic effect definition comprises modifying at least one of a magnitude parameter, a frequency parameter, a directionality parameter, an attack parameter, a decay parameter, or a duration parameter.

11. The system of claim 8, further comprising instructions for:
    receiving motion data; and
    modifying the haptic effect definition based on the motion data.

12. The system of claim 11,
    wherein the motion data comprises at least one of: a motion of a user input element of the peripheral device from a first axis to a second axis; or a motion of the user input element from a first direction to a second direction.

13. The system of claim 11,
    wherein the data further comprises one of a closure rate of the user input element or a force applied to the user input element.

14. The system of claim 8,
    wherein the data comprises a position of the user input element;

wherein the position is detected by a sensor coupled to the user input element; and wherein the user input element is one of a digital button, analog button, bumper, directional pad, analog stick, digital stick, driving wheel, slider, or trigger.

15. A non-transitory computer-readable medium having instructions stored thereon that, when executed by a processor, cause the processor to modify a haptic effect experienced at a user input element, the instructions comprising:

receiving data associated with a user interaction from a peripheral device;

modifying a haptic effect definition based on the data to generate a modified haptic effect definition that compensates for a change to an original haptic effect caused by the user interaction so as to maintain the original haptic effect;

sending an instruction and the modified haptic effect definition to the peripheral device; and causing a haptic output device to modify a haptic effect based on the modified haptic effect definition at the user input element of the peripheral device in response to the instruction.

16. The non-transitory computer-readable medium of claim 15, wherein the modifying the haptic data of the haptic effect definition comprises modifying at least one of a magnitude parameter, a frequency parameter, a directionality parameter, an attack parameter, a decay parameter, or a duration parameter.

17. The non-transitory computer-readable medium of claim 15, further comprising instructions for:

receiving motion data; and modifying the haptic effect definition based on the motion data.

18. The non-transitory computer-readable medium of claim 15, wherein the motion data comprises at least one of: a motion of a user input element of the peripheral device from a first axis to a second axis; or a motion of the user input element from a first direction to a second direction.

19. The non-transitory computer-readable medium of claim 15, wherein the data further comprises one of a closure rate of the user input element or a force applied to the user input element.

20. The non-transitory computer-readable medium of claim 15, wherein the data comprises a position of the user input element;

wherein the position is detected by a sensor coupled to the user input element; and wherein the user input element is one of a digital button, analog button, bumper, directional pad, analog stick, digital stick, driving wheel, slider, or trigger.

* * * * *